Sept. 22, 1953   H. G. FOSTER   2,652,809
ANIMAL RELEASING LEASH
Filed Sept. 14, 1951

INVENTOR
Harry G. Foster
BY
ATTORNEYS

UNITED STATES PATENT OFFICE 2,652,809

ANIMAL RELEASING LEASH

Harry G. Foster, Mullens, W. Va.

Application September 14, 1951, Serial No. 246,562

12 Claims. (Cl. 119—114)

This invention relates to improvements in dog leashes adapted to be combined or used with dog collars and for other animals, for restraining, holding and handling the same.

In the handling of dogs at field trials and shows, particularly, it is desirable to restrain the animal until his turn is reached for showing, when he should be released in the simplest and most effective manner possible, preferably without knowledge of the animal as to when the release is accomplished. In some cases it is desirable to remove the collar as well as the leash from the animal and without any apparent unbuckling or disengagement of the collar or the leash, as the case may be. No satisfactory provision has been made heretofore that will accomplish these results effectively.

An object of this invention is to provide a simple and effective release of an animal, with or without the collar, and without any substantial motion that would warn the dog or show when the release is effected.

Another object of the invention is to improve the construction of leashes for dogs and other animals that will provide for the effective restraining thereof, and yet which will permit of the release of the animal very simply and without the usual disengagement of a hook or snap, such as would be involved ordinarily with most leashes used heretofore.

Still another object of the invention is to improve the construction of snap hooks for dog leashes and for other animals which will effectively restrain the animal in a secure position and yet may be released readily when desired by the operator.

These objectives may be accomplished according to one embodiment of this invention by providing a leash with a snap hook attached thereto, constructed so as to be contained in closed position for retaining the animal securely and yet may be released by a flexible member that extends lengthwise of the leash to the handle thereof, or it may be manipulated by the operator in a very simple motion that will not warn the animal of the act of release being accomplished. The snap hook may be used so as to form a part of a collar for the animal or it may be constructed to engage detachably a separate collar, and in either event will secure the animal effectively in locked relation until manually released.

This embodiment of the invention, together with a modification thereof, are illustrated in the accompanying drawings in which.

Figure 1:
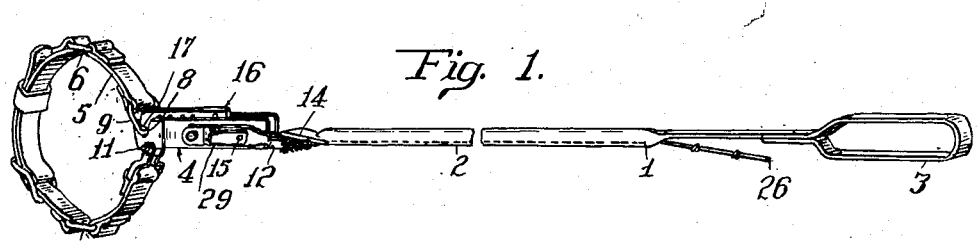
Fig. 1 is a perspective view of a combined dog leash and collar showing the invention applied thereto.

The invention is shown as applied to a dog leash, although it will be appreciated that it may be used in leashes for other animals and other forms of restraining devices, as desired. The leash is designated generally by the numeral 1 and preferably is formed of leather, rawhide or other suitable strong flexible material that may be used for the purpose. The leash 1 is shown as provided with guide means lengthwise of the major portion thereof formed in this embodiment of a tubular portion 2 provided by turning over the edges of the strip of material and stitching these edges together in the form of an elongated tube. Any other suitable guide means may be used as may be desired. A handle 3 is formed at one end of the leash 1 and may be provided in any suitable manner as a means of grasping and holding the leash for restraining the animal.

At the opposite end of the leash 1 from the handle 3 is a snap hook generally designated by the numeral 4 for attachment to a collar generally indicated at 5. Any suitable form of collar may be used according to the purpose and manner of use of the leash. The collar 5 as illustrated is of the form adapted to be retained on the leash, although the latter may be used if desired, with a standard collar intended to be retained on the animal upon release of the latter from the leash. The standard or conventional collar usually has a D-ring which may be engaged in the notches 8, 11, hereinafter described, for detachably connecting the leash and snap hook thereto. In this form the collar 5 is shown as having hinge links 6 intermediate the length thereof to provide greater flexibility when desired, which is desirable especially when using heavy leather for the collar.

The snap hook 4 in the embodiment illustrated comprises a body portion generally designated at 7, which is U-shape in cross section for enclosing the operating parts of the snap hook. At one end the body portion 7 is provided with a notch 8 of appreciable depth into one side thereof as shown particularly in Figs. 5 and 6 adapted to receive a ring 9 on the collar 5. Where the collar is adapted to be retained on the animal when released, this ring 9 will be the usual D-ring attached to the collar, but in this instance there is a detachable end connection for the collar 5 as shown in Fig. 1. The opposite end of the collar is provided with a link 10 pivotally connected with the body 7 of the snap hook by a pin 11 which preferably is detachable from the body for removal of the collar. Normally, however, the pin 11 would retain the collar 5 on the snap hook and leash to which it is attached even after separation and detachment of the ring 9. The opposite end of the body 7 is provided with a yoke 12 for attaching the snap hook 4 to the leash 1. This yoke 12 has opposite sides embracing the body 7 and secured permanently and rigidly thereto, with a cross bar 13 receiving a loop 14 at the adjacent end of the leash 1, the loop being turned back upon itself about the cross bar 13 and stitched permanently as a secure connection between the leash 1 and the snap hook 4.

A pin 15 extends from side to side through the body 7 with its ends turned over forming a riveted connection for securing the yoke 12 to the body 7. The pin 15 also forms a pivotal support for a catch generally indicated at 16 operatively mounted in the body 7.

Figure 5:
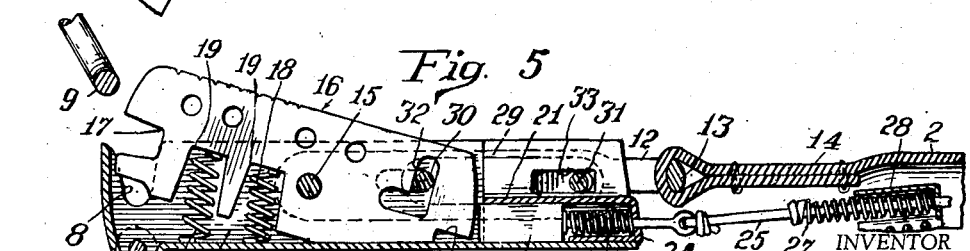
Fig. 5 is a view similar to Fig. 3 showing the snap hook in open position.
Figure 6:
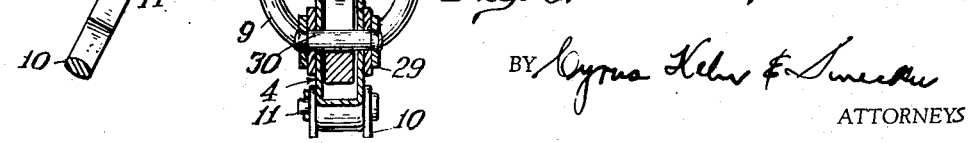
Fig. 6 is a cross section on the line 6—6 in Fig. 6.

The catch 16 has a notch 17 in one end portion thereof in position for over-lapping the notch 8 in the body 7, extending transversely of the latter as will be apparent from Fig. 5. Thus the ring 9 of the collar is received in the notch 17 and held therein and in the notch 8 forming a secure attachment of that ring and end portion of the collar to the snap hook 4 until the catch 16 is released.

Normally the catch 16 assumes the position shown in Fig. 5 being pressed upward by one or more springs 18 interposed between the closed side of the body 7 and the adjacent portions of the catch 16. In the form shown, these springs 18 are received in notches 19 formed in the lower edge of the catch 16. The springs 18 are interposed between the hinge pin 15 and the end of the catch 16, which has the notch 17 for attachment to the collar.

Figure 3:
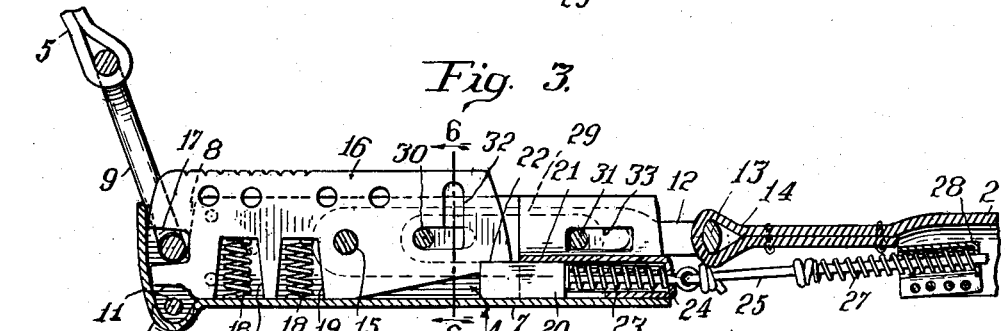
Fig. 3 is a longitudinal mid-sectional view through the structure shown in Fig. 2.

The opposite end of the catch 16 is adapted to be secured or latched so as to hold this catch in its retaining position as shown in Fig. 3. A latch 20 may be provided for this purpose slidably mounted in the body 7 between the latter and a bridge 21 within the body. The latch 20 is in position to engage a notch 22 formed as a shoulder on the back end of the catch 16 and when the latch is in its engaging position as shown in Fig. 3, the catch 16 is secured against swinging movement, thereby retaining the collar securely to the snap hook. A spring 23 surrounds the shank of the latch 20 and normally urges the latch forward to the position shown in Fig. 3, this spring 23 being interposed between the body of the latch and a fixed abutment 24 mounted in the body 7. The shank of the latch 20 is attached to a cable or string generally indicated at 25 extending outwardly from the snap hook 4 and the leash 1 to a hand portion 26 adjacent to handle 3 on the leash. The hand portion 26 is adapted to be grasped by the operator for releasing the latch 20 and thereby disengaging the leash from the animal, either with or without the collar, according to the manner of connection thereof.

The cord or string 25 is guided along the leash 1 by suitable guide means which in the embodiment here set forth is provided by extending the cord or string through the tubular portion 2 of the leash.

In addition to the spring 23 which acts on the cord or string 25, it may be desirable to provide an additional spring acting thereon to draw downward this string or cord through the tubular portion 2 of the leash after release of the hand hold portion 26, as indicated at 27. The spring 27 is anchored at one end to the cord or string 25 and at its opposite end it bears against a sleeve 28 inserted into the adjacent end of the tubular portion 2 of the leash, being retained in place thereon by rivets, preferably, although other suitable fastening means may be used as desired.

Figure 2:
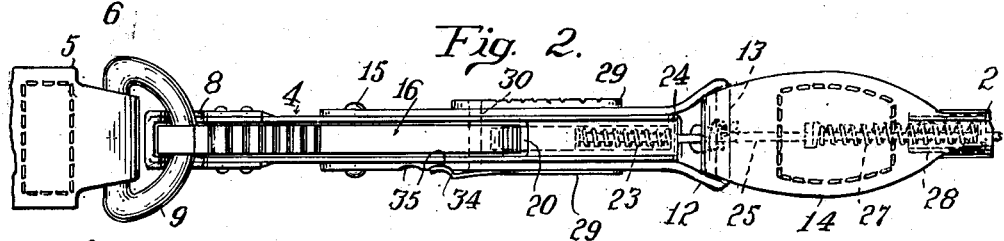
Fig. 2 is an enlarged top plan view, showing particularly the snap hook and connected portions of the collar and leash.

Provision may be made, if desired, for locking the catch 16 in its closed position as shown in Fig. 3, although such locking means is not essential and may be omitted if not required. In the example illustrated, the locking means comprises a pair of plates 29, one on either side of the body 7 and connected together by pins 30 and 31, which extend transversely through the body 7 and through slots in opposite sides thereof for sliding movement of the pins 30 and 31 and of the plates 29 lengthwise of the body 7. The pin 30 extends through a right angular slot 32 in the catch 16 as shown in Fig. 3, while the pin 31 extends through a straight slot 33 in opposite sides of the body 7. Normally the plates 29 are pressed forward in the position shown in Fig. 3 to lock the catch 16 against swinging movement about the pivot pin 15, even when the latch 20, is disengaged therefrom. A leaf spring 34, may be used on one of the plates 29, as shown in Fig. 2 to engage the notches 35 in a side of the body 7 or the yoke 12 to retain the locking plates 29 in their adjusted positions. When the locking plates 29 are withdrawn or moved to the right from the position represented by the pins 30 and 31 in Fig. 3 to the position shown in Figs. 2 and 5, the pin 30 will be in the angular portion of the slot 32. In that position, the catch 16 is free to turn on the pivot pin 15 under the action of the springs 18 upon release of the latch 20, assuming the position shown in Fig. 5. Thus the animal can be disengaged from the collar 5, either with or without separation of the collar from the animal, according to the construction of the former and the manner of attachment thereof to the snap hook 4. However, after engagement of the animal and the closing of the catch 16 to retain the collar on the leash, the locking plates 29 may be moved forward to the position represented by Fig. 3 for securing the catch 16 against accidental release until this locking device is operated.

Figure 4:
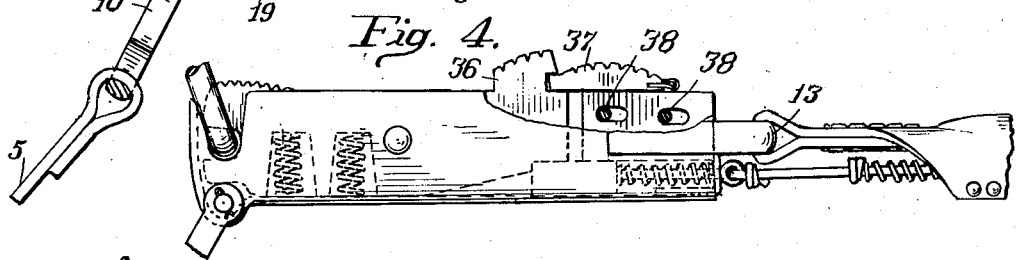
Fig. 4 is a side elevation, similar to Fig. 1, partly in section, showing a modification of the locking means for the snap hook.

A modified form of locking device is shown in Fig. 4 in which the catch is provided with a shoulder 36 in position to be engaged by a slidable locking member 37 mounted in the body of the snap hook for movement lengthwise thereof. Pins 38 extend from side to side of the body of the snap hook, forming a guide for the locking member 37. Otherwise, this form of device functions in the same manner as described above.

The operation of the leash and snap hook will be evident from the foregoing description without requiring repetition. It will be apparent that the animal can be retained securely on the leash until its release is desired and then it may be disengaged therefrom very simply and effectively merely by grasping the handhold 26 and pulling upward thereon, without such movement being apparent to the animal, and without requiring any such action as would make evident to the animal the fact of its release. At the same time, until released, the animal will be retained securely on the leash without danger of accidental separation or removal therefrom. The device is extremely effective for its intended purpose and relatively simple to manufacture and use.

While the invention has been illustrated and described in certain embodiments, it is recognized that variations and changes may be made therein without departing from the invention, except as specified in the claims.

I claim:

1. An animal leash adapted for attachment to a collar of an animal, comprising an elongated leash member having a handle at one end portion thereof, a snap hook connected with the leash member at the opposite end portion thereof, latch means connected with the snap hook for engaging the collar and holding the collar securely to the snap hook, said leash member having a tubular portion extending lengthwise thereof, and a flexible member connected with the latch means and extending through said tubular portion to a point adjacent to the handle for manual manipulation to release the latch means, a sleeve fixed to the tubular portion of the leash member, and a coiled spring bearing against the sleeve at one end and having its opposite end anchored to the flexible member normally tending to move said flexible member in one direction.

2. An animal leash comprising a leash member, a snap hook connected with the leash member, a collar for the animal connected at one end portion thereof with the snap hook and having a ring member at the opposite end portion thereof adapted for detachable engagement with the snap hook, and a catch mounted on the snap hook for detachably engaging the ring member means pivotally connecting the catch to the snap hook, and spring means acting on the catch between said pivot means and the point of engagement with the ring member tending to move the catch to an open position for disengagement of the ring member.

3. A snap hook for an animal leash comprising an elongated body having a hook at one end portion thereof adapted for engagement with an animal collar, a catch extending lengthwise of the body, means pivoting the catch on the body for swinging movement relative thereto, said catch having an opening therein in position to receive a portion of the animal collar and intersecting the hook in closed position, and spring means interposed between the body and the catch and located between the pivot means and the opening normally acting to move the catch to an open position.

4. A snap hook for an animal leash comprising an elongated body having a hook at one end portion thereof adapted for engagement with an animal collar, a catch extending lengthwise of the body, means pivoting the catch on the body for swinging movement relative thereto, said catch having an opening therein in position to receive a portion of the animal collar and intersecting the hook in closed position, spring means interposed between the body and the catch and located between the pivot means and the opening normally acting to move the catch to an open position, and a spring-pressed latch in position to engage the catch and hold said catch in closed position.

5. A snap hook for an animal leash comprising an elongated body having a hook at one end portion thereof adapted for engagement with an animal collar, a catch extending lengthwise of the body, means pivoting the catch on the body for swinging movement relative thereto, said catch having an opening therein in position to receive a portion of the animal collar and intersecting the hook in closed position, spring means interposed between the body and the catch and located between the pivot means and the opening normally acting to move the catch to an open position, and lock means connected with the body in position to engage the catch in closed position and hold the catch against opening movement.

6. An animal leash comprising a collar having opposite ends and adapted to be applied to an animal, a hook device including a body connected with one end of the collar, a catch member operatively connected with the body and having a keeper portion thereon for engaging and anchoring the opposite end of the collar, a latch member operatively connected with the body in position for engaging the catch member and locking the keeper portion thereof in engagement with the collar, a leash member connected with the body, and a flexible member connected with the latch member and extending lengthwise of the leash member.

7. An animal leash comprising a collar having opposite ends and adapted to be applied to an animal, a hook device including a body connected with one end of the collar, a catch member pivotally connected with the body and having a keeper portion thereon for engaging and anchoring the opposite end of the collar, a latch member slidably mounted on the body behind the catch member in position to hold the keeper portion closed on the collar, a leash member connected with the body, and a flexible member connected with the latch member and extending lengthwise of the leash member.

8. An animal leash comprising a collar having opposite ends and adapted to be applied to an animal, a hook device including a body connected with one end of the collar, a catch member pivotally connected with the body and having a keeper portion thereon for engaging and anchoring the opposite end of the collar, a spring bearing on the catch member in a direction to open the keeper portion thereof, a latch member slidably mounted on the body in position to engage the catch member in opposition to the spring, a leash member connected with the body, and a flexible member connected with the latch member and extending lengthwise of the leash member.

9. An animal leash comprising a collar having opposite ends and adapted to be applied to an animal, a hook device including a body connected with one end of the collar, a catch member pivotally connected with the body and having a keeper portion thereon for engaging and anchoring the opposite end of the collar, said keeper portion comprising a notch in the end of the catch member, the body having a notch in the side thereof intersecting the notch in the catch member in closed position of the latter, a latch member slidably mounted on the body behind the catch member in position to hold the keeper portion closed on the collar, a leash member connected with the body, and a flexible member connected with the latch member and extending lengthwise of the leash member.

10. An animal leash comprising a collar having opposite ends and adapted to be applied to an animal, a hook device including a body connected with one end of the collar, a catch member operatively connected with the body and having a keeper portion thereon for engaging and anchoring the opposite end of the collar, a latch member operatively connected with the body in position for engaging the catch member and locking the keeper portion thereof in engagement with the collar, a leash member connected with the body, and a flexible member connected with the latch member and extending lengthwise of the leash member, said leash member being folded over upon itself enclosing the flexible member therein substantially throughout its length.

11. An animal leash comprising a collar having opposite ends and adapted to be applied to an animal, a hook device including a body connected with one end of the collar, a catch member operatively connected with the body and having a keeper portion thereon for engaging and anchoring the opposite end of the collar, a latch member operatively connected with the body in position for engaging the catch member and locking the keeper portion thereof in engagement with the collar, a leash member connected with the body, a flexible member connected with the latch member and extending lengthwise of the leash member, and resilient means connected with the flexible member normally tending to move the flexible member forward relative to the leash member.

12. An animal leash comprising a collar having opposite ends and adapted to be applied to an animal, said collar having separate sections connected together by a plurality of spaced hinge links intermediate said opposite ends, a hook device including a body connected with one end of the collar, a catch member operatively connected with the body and having a keeper portion thereon for engaging and anchoring the opposite end of the collar, a latch member operatively connected with the body in position for engaging the catch member and locking the keeper portion thereof in engagement with the collar, a leash member connected with the body, and a flexible member connected with the latch member and extending lengthwise of the leash member.

HARRY G. FOSTER.

References Cited in the file of this patent

UNITED STATES PATENTS

| Number | Name | Date |
|---|---|---|
| 770,070 | Johnson | Sept. 13, 1904 |
| 794,563 | Stahlknecht | July 11, 1905 |
| 1,290,110 | Deatrick | Jan. 7, 1919 |
| 1,297,872 | Larson | Mar. 18, 1919 |
| 1,626,866 | Neilson | May 3, 1927 |
| 1,949,608 | Johnson | Mar. 6, 1934 |
| 2,555,027 | Clayton | May 29, 1951 |

FOREIGN PATENTS

| Number | Country | Date |
|---|---|---|
| 209,513 | Germany | May 4, 1909 |